United States Patent [19]

Medler et al.

[11] 4,100,013

[45] Jul. 11, 1978

[54] APPARATUS FOR FORMING RESIN EMBEDDED ANTENNA

[75] Inventors: Albert S. Medler; Donald L. Myers, both of Jackson, Mich.

[73] Assignee: Plastigage Corporation, Jackson, Mich.

[21] Appl. No.: 711,992

[22] Filed: Aug. 5, 1976

[51] Int. Cl.$^2$ .............................................. B29D 3/02
[52] U.S. Cl. ................................... 156/441; 425/110; 425/404
[58] Field of Search ............... 156/166, 180, 185, 194, 156/296, 441, 433, 380; 264/145, 148, 174, 337, 25, 26; 28/61, 62; 432/8; 57/34 HS; 425/66, 110, 111, 174, 404, 445; 219/10.61, 390, 388 S, 388 W

[56] References Cited

U.S. PATENT DOCUMENTS

| | | | |
|---|---|---|---|
| 2,456,384 | 12/1948 | Conaway | 28/62 |
| 2,684,318 | 7/1954 | Meek | 156/441 |
| 2,694,661 | 11/1954 | Meyer | 156/441 |
| 2,803,109 | 8/1957 | Stoddard | 28/62 |
| 2,820,280 | 1/1958 | Benn | 28/62 |
| 2,948,649 | 8/1960 | Pancherz | 156/441 |
| 3,405,205 | 10/1968 | Rowe et al. | 264/25 |
| 3,654,030 | 4/1972 | Melquion et al. | 156/441 |
| 3,676,258 | 7/1972 | Jackson | 156/441 |
| 3,684,622 | 8/1972 | Goldsworthy | 156/180 |
| 3,851,022 | 11/1974 | Passarelli | 264/25 |
| 3,905,852 | 9/1975 | Mukai et al. | 156/180 |
| 3,960,629 | 6/1976 | Goldsworthy | 156/180 |

OTHER PUBLICATIONS

Websters Seventh New Collegiate Dictionary, Merriam, Springfield, Mass., 1966, pp. 355 & 700 relied on.

*Primary Examiner*—Willard E. Hoag
*Attorney, Agent, or Firm*—Beaman & Beaman

[57] ABSTRACT

Apparatus for forming an antenna of the self standing type suitable for use with citizen band radios and the like wherein the antenna conductor is embedded within a resin jacket. A plurality of glass fibers are dispensed from spools to form four strands equidistantly disposed about a needle through which the antenna conductor is pulled. The conductor and strands are therein immediately drawn into a gathering die, and the assembly is shaped and cured within an elongated cylindrical heated glass tube for curing purposes. After curing the antenna is cooled and then cut to length.

3 Claims, 6 Drawing Figures

APPARATUS FOR FORMING RESIN EMBEDDED ANTENNA

BACKGROUND OF THE INVENTION

The invention pertains to the field of forming elongated glass fiber elements impregnated with a hardenable dialectric resin wherein such elements may be used for radio antennae.

The popularity of the citizens band radio has developed a need for effective antennas whereby the antenna conductor may be maintained in an extended condition, usually vertical, so as to most effectively transmit and receive radio frequency signals. The shorter antennas available merely consist of a conductor of sufficient strength to support itself, however, radio frequencies are often adversely affected by utilizing antenna conductors of a diameter larger than necessary to most effectively handle the signal, but an increased antenna diameter is necessary for self standing and strength requirements.

If the antenna conductor is supported by a rigid member it is possible to extend the antenna conductor length to a height considerably greater than if the conductor itself is self supporting. For this purpose antennas have been mounted upon wood or fiber glass extensions, but such extensions become troublesome from a maintenance standpoint as they are often damaged by low clearance objects, such as branches, and vibration and movement imposed thereon often causes fracturing due to fatigue.

The encasing of the antenna conductor within a semi-rigid jacket, such as hardened resin, permits a relatively long antenna to be self standing, flexible enough to withstand vibration and impact with stationary objects, and such antennas are commonly referred to as "whip" antennas. This type of antenna has enjoyed popularity in many installations on vehicles, however, manufacturing costs are relatively expensive and it is difficult to provide a high-grade finish upon the resin which is acceptable from an appearance standpoint. Further, manufacturing techniques employed in the past have resulted in weak spots occuring in the resin jacket increasing likelihood of stress points developing. Such resin coated antennas must often be sized and finished by expensive secondary operations, and manufacturing techniques require that the price of such antennas be higher than affordable by many citizen band radio owners.

SUMMARY OF THE INVENTION

It is the object of the invention to provide a method and apparatus for imbedding a radio antenna within a resin coating wherein the antenna is self-standing, flexible to bending forces, resistant to weathering and impact, and economical to manufacture.

Further, the purpose of the invention is to provide a method and apparatus for imbedding an antenna conductor within a resin jacket wherein high production techniques are employed in the manufacture thereof and a smooth exterior resin surface finish is achieved which requires no secondary machining operations. Further, in the practice of the invention a uniform wall thickness of resin is produced, eliminating stress points, and the antenna constructed in accord with the invention may be low priced and available to the mass market.

In the practice of the invention a plurality of dies are used to orient and position glass fiber strands as the strands are saturated with a cross-linked polyvinyl cloride resin and drawn into a glass tube high temperature curing mold. Prior to drawing the strands into the curing tube the strands are passed through a gathering die into which the antenna conductor is fed through a needle-like guide. The glass fiber strands enter the die at four locations to define a square configuration prior to entering the cylindrical die bore, and the antenna conductor is accurately located intermediate all of the strands as the same enter the cylindrical die. Thus, a uniform all thickness of the antenna resin jacket is achieved.

The glass mold tube provides a smoothness not achievable with metallic curing tubes, and the use of the glass tube permits a continuous high production to be achieved requiring little maintenance and supervision. Further, cleaning of the apparatus at termination of a production cycle is simplified, and wear on the curing tube is slight.

DESCRIPTION OF THE DRAWINGS

The aforementioned objects and advantages of the invention will be apparent from the following description and accompanying drawing wherein.

DESCRIPTION OF THE PREFERRED EMBODIMENT

Figure 1:
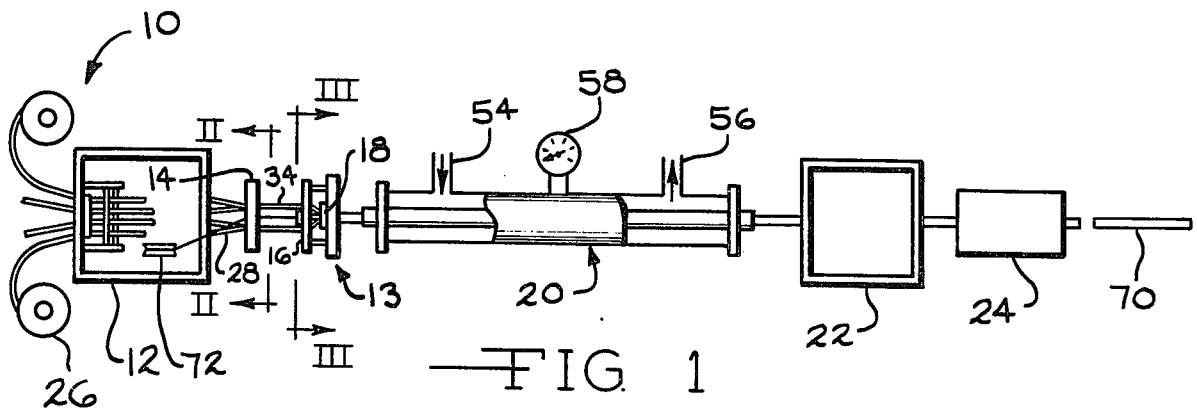
FIG. 1 is an elevational view of antenna manufacturing apparatus in accord with the invention, some componets being shown schematically.

The sequential arrangement of the basic componets of apparatus in accord with the inventive concept is shown in FIG. 1. Such componets include glass fiber dispensing means 10, a resin dip tank 12, a separating plate 14, compressor fixture 13 which involves a compressor fixture plate 16 and a compressor gathering die, a curing mold assembly 20, a cooling tank 22, and pulling and cutting apparatus 24.

The purpose of the invention is to form an elongated member, such as a rod, of glass fiber filaments impregnated with a hardened resin wherein the member is provided with a smooth cylindrical surface after curing which does not require second operations, such as grinding, for finishing and shaping purposes. Further, the invention contemplates the centering of a conducting wire within the glass fiber member capable of transmitting and receiving radio frequency signals whereby the resultant assembly may serve as a self supporting or self standing antenna, particularly suitable for use as a citizens band antenna for vehicles. The glass fiber rod is formed as a continuous member by a continuous process, and the member is cut to its desired length at the final stage of manufacture. In accord with the invention the wire is accurately centered within the elongated member and no secondary operations are required on the member exterior surface as final sizing and surfacing is achieved in the curing mold.

The glass fiber is dispensed from spools, such as at 26, and the glass filaments are, individually, of a diameter of approximately 0.0004 inches. The fibers are assembled in rovings designated 60 end rovings, each end containing approximately 240 filaments.

The glass fiber rovings are passed through a resin tank 12 whereby the rovings are saturated with a hardenable resin, which is in a liquid state within the dip tank. Preferably, the resin employed is a cross-linked polyvinyl cloride resin.

Figures 2, 3, 4:
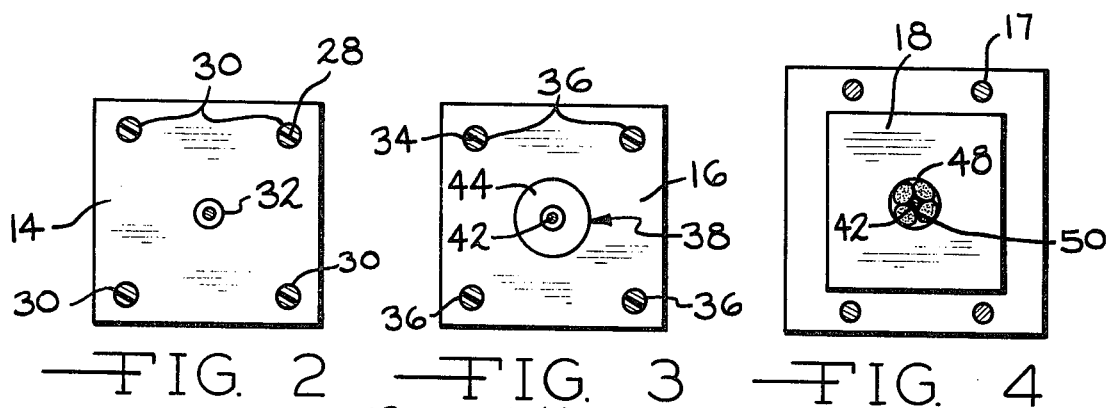
FIG. 2 is a detailed, elevational view of the separating plate as taken along II—II of FIG. 1.
FIG. 3 is a detailed, elevational view of the compressor fixture plate taken along section III—III of FIG. 5.
FIG. 4 is a detailed, elevational view of the compressor fixture gathering die and glass fiber bundles as they enter the die as taken along IV—IV of FIG. 5.

In FIG. 1, four rovings 28 enter the dip tank 12 and pass therefrom, to enter the bores of the separating plate 14. The separating plate includes four bores 30, equally spaced from each other, and equally radially spaced from the antenna wire guide bore 32. Upon the glass fibers entering the bores of the separating plate they are henceforth designated bundles 34 which are received within the plate 16 of the compressor fixture 13. The compressor plate 16 also includes four holes or bores 36 equidistantly spaced from each other and equally radially spaced from the wire positioning guide. The needle-like wire positioner guide 38 has an elongated tubular stem 40 received in a hole in plate 16, through which the antenna wire 42 is fed, and an enlarged head 44. The stem 40 includes an outlet end 46, and the head 44 is adjacent the passage inlet. The gathering die 18 is attached to the compressor plate, and includes a cylindrical bore 48 coaxially aligned with wire positioner stem outlet 46. As apparent from FIG. 4, the diameter of the gathering die 18 is such as to receive the four bundles 34 in a rectangular square relationship against the die periphery wherein a central void or cavity 50 is defined which receives the antenna wire 42. The compressor plate 16 is spaced from die 18 by spacers 17 but is located close to the gathering die 18 to assure a uniform distribution of the glass fibers within the gathering die, and as the outlet of the wire positioning stem 40 is disposed in alignment with the central cavity 50 the antenna wire will be accurately placed at the center of the elongated member being formed and shaped by the gathering die.

Figure 6:
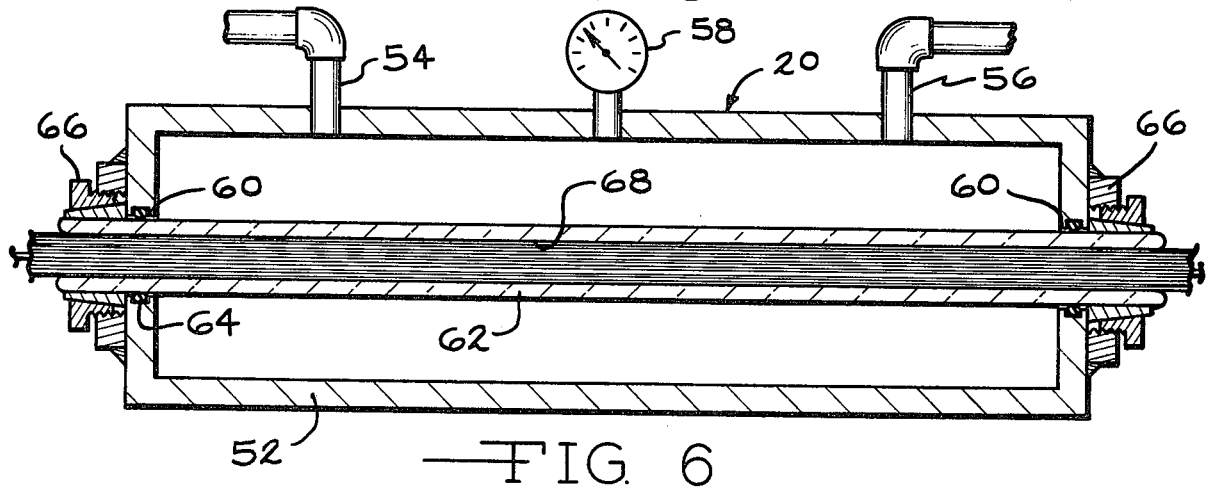
FIG. 6 is a diametrical, elevational, sectional view of the glass curing mold tube and heating manifold.

From the gathering die 18 the glass fiber enters the curing mold assembly 20 which is shown in detail in FIG. 6.

The curing mold assembly includes a manifold jacket 52 having a hot oil inlet 54, and a hot oil return 56. A temperature gauge 58 also communicates with the interior of the jacket. The ends of the jacket 52 are provided with holes 60 in which the glass tube mold 62 is received. The tube 62 is sealed to the jacket by annular seal rings 64, and each end of the jacket is provided with a threaded fitting 66 such that the glass tube may be firmly mechanically mounted to the jacket, and a liquid tight seal between the jacket and tube produced. The tube 62 is formed of a Pryrex glass having rounded ends which will be apparent in FIG. 6. The diameter of the tube is uniform throughout its length, and the tube bore 68 is "glass-smooth" defined by the glass material of the tube. Conventional hot oil heating and pumping apparatus, not shown, is connected to the hot oil inlet and outlet members whereby hot oil of 300 to 350° Fahrenheit is continuously circulated within the jacket about the tube 62 maintaining the tube at a resin curing temperature.

The cured glass fiber member shaped by the curing mold 20 is cooled by the cooling tank 22 which contains water, in the form of a bath or spray, which cools the cured rod prior to the rod entering the combination pulling and cutting apparatus 24. The pulling apparatus 24 may be of the conventional type shown in U.S. Pat. No. 3,728,424, and the cutting equipment may be of the known "flying cutter" type and this apparatus is schematically shown as it constitutes no specific novelty with respect to the inventive concept. At 70 in FIG. 1 the antenna rod is shown as cut to the desired length.

In accord with the invention it is possible to continuously form a glass fiber member having a radio frequency conducting core at ten feet per minute wherein the overall diameter of the rod is 0.25 inches. In a rod of one-half inch diameter the rate of manufacture is approximately 4 foot per minute.

Figure 5:
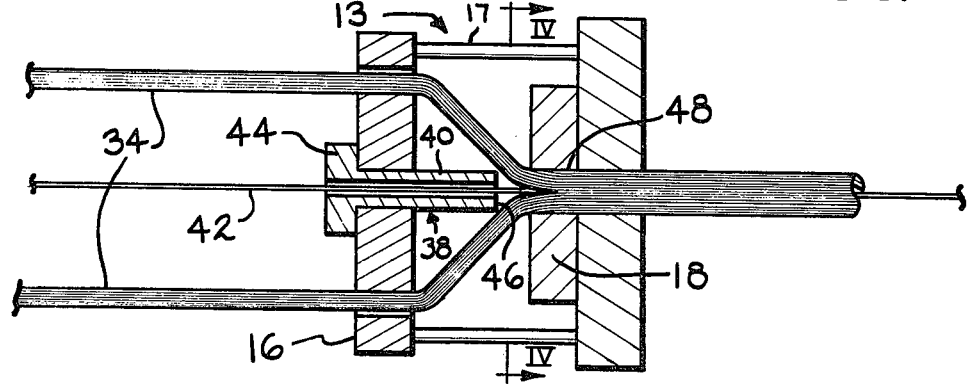
FIG. 5 is an elevational diametrical sectional view of the compressor fixture plate and gathering die.

As the glass fibers enter the gathering die 18 the fact that the bundles 34 permit the glass filaments to be equally dispersed about the circumference of the die bore insures that the wire 42 will be centered within the member. The wire 42 is fed from a spool 72 through the separating plate die bore 32 into the guide stem 40 and the fact that the stem outlet 46 is located adjacent the juncture of the glass fiber bundles as they enter the gathering die, FIG. 5, insures an accurate positioning of the wire with respect to the glass fibers, and the described structure produces an accurate assembly of the antenna wire and the glass fiber filaments.

The rate of movement of the impregnated glass fiber through the mold 20 is such to permit the hot oil within the jacket 52 to sufficiently heat the tube 62 to permit curing of the resin as it passes through the mold tube, and as no secondary operations are required to finish the exterior surface of the formed elongated member the severed antenna lengths 70 may be boxed for shipment once cut to the predetermined length.

An important aspect of the invention lies in the use of the smooth bore within the curing mold defined by glass tube 62. Heretofore it has not been impossible to produce an acceptable product by curing glass fiber resin while moving through an elongated mold. Previously, jamming occurred within the elongated mold, and it was not possible to keep apparatus of this type running for extended periods of time. In the practice of the invention accumulation of resin within the mold tube does not occur which requires periodic stoppage and cleaning of the curing mold and superior operating characteristics have been achieved as compared with known glass fiber elongated member forming apparatus.

It is appreciated that various modifications within the spirit and scope of the invention may be apparent to those skilled in the art.

We claim:

1. Apparatus for producing a smooth glass fiber reinforced elongated member in a continuous operation comprising, in combination, glass fiber filament dispensing means, means for impregnating said filaments with a hardenable resin, means for forming said filaments into a plurality of bundles, a cylindrical gathering die having a bore and an axis, means for feeding said bundles into said die equidistantly located about said bore and axis of said die, an elongated glass tube curing mold receiving said glass fiber filaments from said die, said mold having a glass smooth bore of a uniform diameter substantially equal to the diameter of said gathering die, means for heating said mold to a resin curing temperature, cooling means receiving said glass fiber elements after curing by said mold, and pulling means pulling said glass fibers through said impregnating means, gathering die, mold and cooling means at a rate to permit curing of said resin while within said mold.

2. Apparatus for producing a smooth glass fiber reinforced member comprising, in combination, glass fiber filament dispensing means dispensing a plurality of glass fiber filaments, means for impregnating said filaments with a hardenable resin, a plate having an axis and a plurality of holes equidistant from each other and said axis, said impregnated glass fiber filaments being received within said holes and substantially equally divided therebetween whereby a bundle of glass fiber filaments passes through each hole, a cylindrical gathering die having a bore having an axis coicident with said plate axis receiving said bundles, said bundles being evenly distributed about the bore of said die, a glass tube having a cylindrical smooth glass bore of uniform diameter, said tube having an inlet adjacent said die coaxial with said die axis, a heated medium jacket encompassing said tube receiving a heated medium for heating said tube to a resin curing temperature, and pulling means pulling said glass fibers through said die and tube at a rate to permit curing of said resin while within said tube.

3. In apparatus for producing a smooth glass fiber reinforced member as in claim 2, means rigidly interconnecting said plate and gathering die, a wire positioning tube within said plate having an outlet coincident with the axis of said plate and die and disposed adjacent to the entrance of said die bore, antenna wire dispensing means feeding a wire into said positioning tube, said wire being pulled through said die and tube with said glass fibers wherein said glass fibers uniformly surround said wire.

* * * * *